Oct. 3, 1972  R. A. BRODIE  3,695,938

MAGNETIC BATTERY MOUNTING

Filed Oct. 19, 1970

RICHARD A. BRODIE
INVENTOR.

BY

AGENT.

United States Patent Office 3,695,938
Patented Oct. 3, 1972

3,695,938
MAGNETIC BATTERY MOUNTING
Richard A. Brodie, 180 S. Rosemead Blvd.,
Pasadena, Calif. 91107
Filed Oct. 19, 1970, Ser. No. 81,837
Int. Cl. H01m 1/04
U.S. Cl. 136—173                    5 Claims

ABSTRACT OF THE DISCLOSURE

A magnetized ring particularly suitable for receiving a miniaturized battery therein, is mounted adjacent an electronic system such as a hearing aid in a manner so as to provide power thereto.

BACKGROUND OF THE INVENTION

The invention described hereinafter pertains to the simplification of the mounting and removal of the very small and difficult-to-handle miniaturized batteries used in modern miniaturized electronic systems such as hearing aids and other such instruments and appliances.

It has become increasingly difficult to handle these small batteries and will become more so as the batteries are further miniaturized as well as the appliances in which they are being used.

The ferromagnetic materials used in making the cases of these batteries make it possible to use a magnetic mounting means which provides simplification of this difficult chore by attracting and holding the battery while it is being positioned. It also provides a reliable biasing means for holding the battery against the electrical contacts once it has been positioned.

DESCRIPTION OF THE PREFERRED EMBODIMENT

Figure 1:
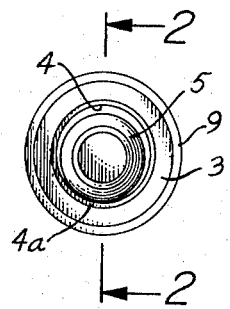
FIG. 1 is an end view of a battery installed in the magnetic ring.
Figure 2:
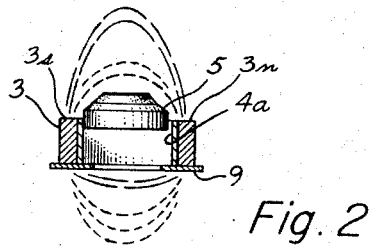
FIG. 2 is a section 2—2 of FIG. 1 showing the effects of the ferromagnetic materials on the flux pattern.

Reference is directed to the figures. A conventional hearing aid of the type mounted in the sidepiece of a pair of eyeglasses is used to illustrate a typical use for this invention.

The sidepiece 1 is provided with an annular recess 2 disposed adjacent the electronic system 11 mounted therein and is capable of receiving a ring magnet 3 formed in the shape of an open ended cylinder.

The magnet 3 is rigidly disposed in the cavity 2 and is magnetized as a horseshoe with the poles 3n and 3s on opposite sides of one face of the ring. This arrangement provides a concentrated flux fixed at the internal end of the ring. Mounting the magnet 3 thus provides a diametrically reduced annular recess 4 capable of receiving a battery 5.

Figure 4:
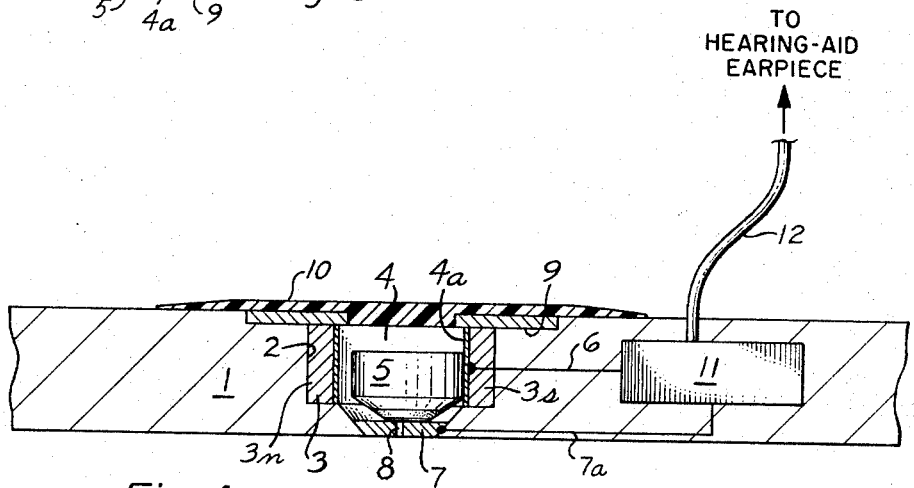
FIG. 4 is a sectional view of the sidepiece of a pair of eyeglasses with the hearing aid system mounted therein.

A substantially cylindrical battery 5 is axially disposed within the battery recess 4 with its central contact (negative contact) pointing inwardly (see FIG. 4).

Figure 3:
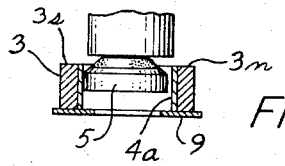
FIG. 3 is a sectional view showing the electrical contacts for the battery mounting.

A thin disc 9 of ferromagnetic material is removably mounted to the outer end of the magnet 3. The disc 9 alters the magnetic flux path (see FIG. 3) so that lines of flux at the outer end are diverted out of the cavity 4. This causes the battery to be more strongly biased in an inward direction making good contact with an electrical connector 7.

The internal surface of the ring magnet 3 is provided with a coating 4a which has a good electrical conductor and serves as the electrical connection between the positive pole of the battery and the electronics system 11 through an electrical lead 6.

The negative pole of the battery is connected to the electronic system 11 through an electrical contact 7 centrally located on the internal surface of the battery cavity 4. An electrical lead 7a connects the contact 7 to the electronics system.

A signal lead 12 extends from the electronics system to a hearing aid earpiece (not shown).

The disc 9 is rigidly mounted to a flat elastomeric member 10 to provide a cover and seal for the battery cavity 4.

A small through bore 8 is disposed in the contact 7 so as to provide access to the battery when being removed. A small probe can be inserted through the bore 8 to force the battery from the cavity.

What is claimed is:
1. A magnetic battery mounting comprising:
   (A) a ring magnet;
   (B) a battery magnetically retained within said ring magnet; and
   (C) connecting means for electrically connecting said battery to an electronics system in a manner so as to provide electrical power thereto.
2. A magnetic battery mounting comprising:
   (A) mounting means for mounting a battery adjacent an electronic system;
   (B) a substantially annular recess formed in said mounting means adjacent said electronics system;
   (C) a substantially annular ring magnet rigidly disposed within said recess providing a reduced annular recess adapted to receive a battery;
   (D) a battery having a substantially cylindrical configuration removably disposed within said ring magnet;
   (E) a ferromagnetic disc removably disposed on the outer end of said ring magnet; and
   (F) electrical connnecting means for connecting said battery to said electronic system in a manner so as to furnish power thereto.
3. A magnetic battery mounting as described in claim 1 wherein said magnetic ring is magnetized as a horseshoe with at least two poles on one face.
4. A magnetic battery mounting as described in claim 1 wherein said positive electrical connection is made by coating the internal surface of said ring magnet with an electrically conductive material.
5. A magnetic battery mounting as described in claim 2 wherein said ferromagnetic disc orients the magnetic flux pattern so as to bias said battery against the inner walls of said ring magnet ot provide the positive electrical contact for said battery and secondly to bias it downwardly into the battery cavity to bear upon the negative contact therein.

References Cited

UNITED STATES PATENTS 3,062,911  11/1962  Joy _____ 136—173
3,095,483  6/1963  Tresise et al. _____ 136—173

DONALD L. WALTON, Primary Examiner

U.S. Cl. X.R.

136—181